M. D. Wells.
Revolving Rake.

Nº 51503. Patented Dec. 12, 1865.

Witnesses.

Inventor.
M. D. Wells.

UNITED STATES PATENT OFFICE.

M. D. WELLS, OF MORGANTOWN, WEST VIRGINIA.

IMPROVEMENT IN HORSE-RAKES.

Specification forming part of Letters Patent No. 51,503, dated December 12, 1865.

*To all whom it may concern:*

Be it known that I, M. D. WELLS, of Morgantown, in the county of Monongalia and State of West Virginia, have invented a new and Improved Horse-Rake; and I do hereby declare that the following is a full, clear, and exact description thereof, which will enable others skilled in the art to make and use the same, reference being had to the accompanying drawings, forming part of this specification, in which—

Figure 1:
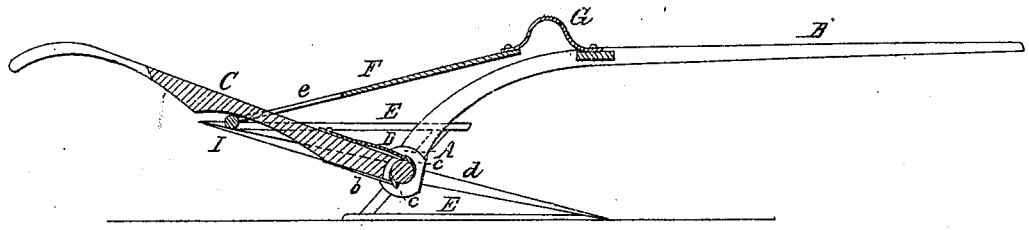
Figure 2:
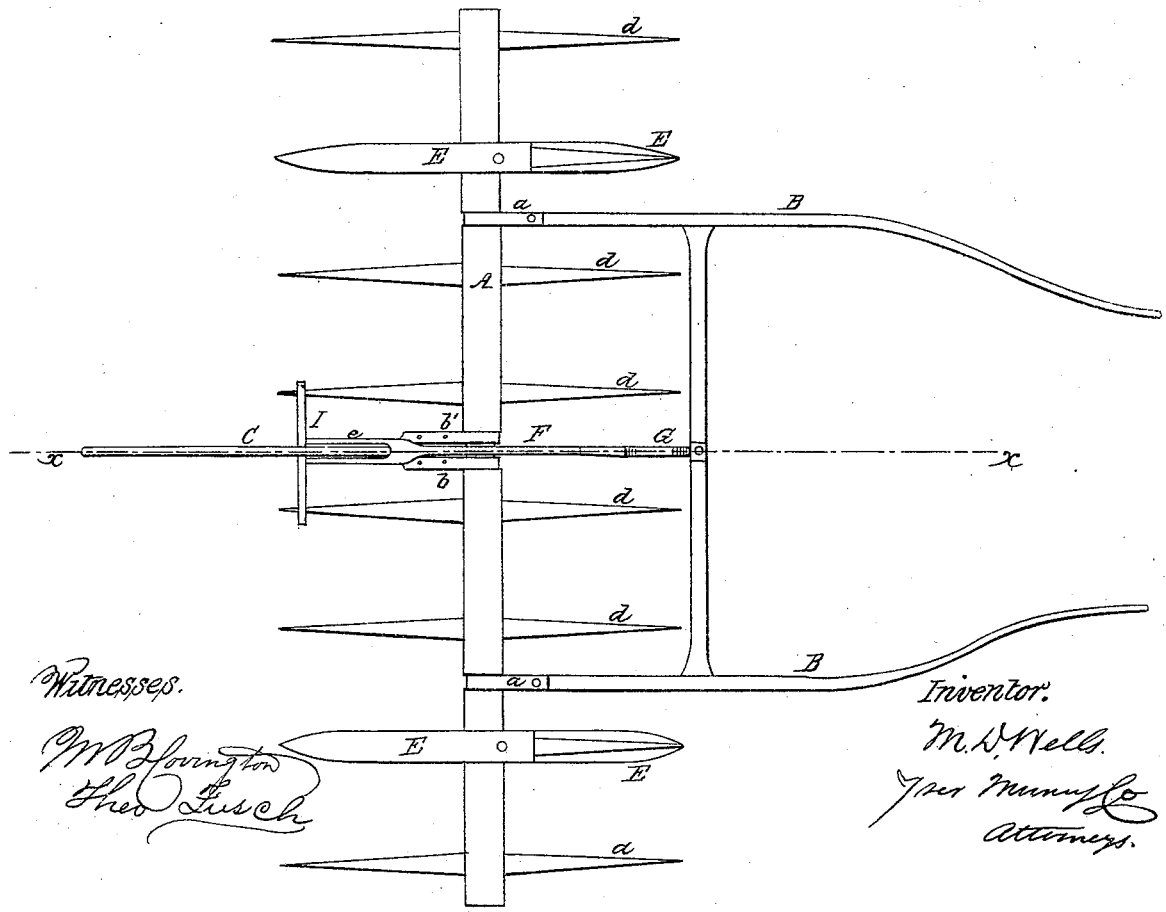

Figure 1 is a transverse vertical section of my invention, taken in the line $x$ $x$, Fig. 2. Fig. 2, a plan or top view of the same.

Similar letters of reference indicate like parts.

This invention relates to a new and useful improvement in that class of horse-rakes which discharge their load by a revolving movement; and it consists in the employment or use of a simple attachment for controlling or regulating the turning of the rake, as hereinafter set forth.

A represents the rake-head, to which the thills B B are attached by metal straps $a$, the head being allowed to turn freely in the straps; and $c$ is a lever, which is fitted centrally to the rake-head by a metal box or by straps $b$ $b'$, to admit of the head freely turning. The front end of said lever C, between the straps $b$ $b'$, has a pawl, D, secured to it, to catch against projections $c$ $c$ and hold the rake in position or prevent it from casually turning.

The teeth $d$ pass through the head A, and are arranged in the usual way, and the rake is provided at each side with two runners, E, the two runners, at the under side of the rake, bearing or resting upon the ground.

The lever C extends or projects back at the rear of the rake-head A, and its back end is curved to form a handle, as shown in Fig. 1.

F represents a bar, the front end of which is connected by a spring, G, with the cross-bar H of the thills B B. This bar has an oblong slot, $e$, made in it at its rear end, through which the lever C passes, and a rod, I, is attached to the rear end of the bar F at right angles, said bar resting on two of the rear teeth, $d$, of the rake when the latter is at work.

The operation is as follows: As the rake is drawn along the driver may at any time, in order to clear obstructions, raise the front end of the front teeth of the rake by pressing down the lever C, which bears on the two teeth $d$ $d$, previously mentioned, and raises the front ends of the front teeth of the rake. This operation requires to be frequently performed on rough land.

The spring G, it will be seen, admits of the bar F yielding or giving as the rear of the rake is pressed down, and is the essential feature of the invention, for without said spring the rod I could not be pressed down on the rake-teeth.

When the rake is to be turned the lever C is raised, the pawl D, in consequence of bearing against one of the projections $c$, preventing the lever from turning on the head A, and causing the front ends of the front teeth to catch against the earth, the rod I being liberated by the raising of the lever C, and by means of bar F and the spring G shoved off from the rear teeth of the rake, the latter making a half-revolution in order to discharge its load, and the rod I, when the lever C is again pressed down, resting on the teeth of the rake.

The device is extremely simple and efficient, and may be applied at a small cost.

I do not claim the revolving rake, for that is old and well known; neither do I claim separately the lever C, fitted to the rake-head and provided with a pawl to catch against projections on said head, for that is also old; but I do claim as new and desire to secure by Letters Patent—

The bar F, attached by a spring, G, to the cross-bar H of the thills B B, and provided with a rod, I, at its rear end, in combination with the lever C, all arranged and applied to the rake, to operate substantially in the manner as and for the purpose set forth.

The above specification of my invention signed by me this 27th day of September, 1865.

M. D. WELLS.

Witnesses:
B. F. BALDWIN,
JOHN S. DERING.